(12) United States Patent
Kaess et al.

(10) Patent No.: US 8,813,578 B2
(45) Date of Patent: Aug. 26, 2014

(54) SENSOR SYSTEM

(75) Inventors: Udo Kaess, Stuttgart (DE); Axel Kaschner, Tuebingen (DE); Juergen Kurle, Reutlingen (DE); Lars Sodan, Reutlingen (DE); Holger Behrens, Reutlingen (DE)

(73) Assignee: Robert Bosch GmbH, Stuttgart (DE)

( * ) Notice: Subject to any disclaimer, the term of this patent is extended or adjusted under 35 U.S.C. 154(b) by 309 days.

(21) Appl. No.: 13/325,577

(22) Filed: Dec. 14, 2011

(65) Prior Publication Data

US 2012/0152034 A1    Jun. 21, 2012

(30) Foreign Application Priority Data

Dec. 20, 2010 (DE) .......................... 10 2010 063 499
Jan. 12, 2011 (DE) .......................... 10 2011 002 563

(51) Int. Cl.
*G01L 3/00* (2006.01)
*G01B 7/30* (2006.01)

(52) U.S. Cl.
USPC .............. 73/862.333; 73/862.335; 324/207.2; 324/207.25

(58) Field of Classification Search
USPC .................. 73/862.331–862.335; 324/207.2, 324/207.25
See application file for complete search history.

(56) References Cited

U.S. PATENT DOCUMENTS

| 6,363,797 | B1 * | 4/2002 | Tokumoto ................ 73/862.328 |
| 6,513,396 | B2 * | 2/2003 | Nakamura et al. ........ 73/862.335 |
| 6,543,571 | B2 * | 4/2003 | Tokumoto .................... 180/446 |
| 6,983,664 | B2 * | 1/2006 | Tokumoto ................ 73/862.329 |
| 7,051,602 | B2 * | 5/2006 | Nakane et al. ............ 73/862.333 |
| 7,339,370 | B2 * | 3/2008 | Reimer et al. ........... 324/207.25 |
| 7,363,825 | B2 * | 4/2008 | Feng et al. ............... 73/862.325 |
| 7,409,878 | B2 * | 8/2008 | Von Beck et al. ........ 73/862.333 |
| 8,047,084 | B2 * | 11/2011 | Okuyama et al. ........ 73/862.335 |
| 8,528,422 | B2 * | 9/2013 | Sanada et al. ............ 73/862.335 |
| 2003/0062890 | A1 * | 4/2003 | Tokumoto ................ 324/207.25 |
| 2004/0154410 | A1 * | 8/2004 | Kondo et al. ............... 73/862.23 |
| 2005/0253578 | A1 * | 11/2005 | Kawashima et al. .... 324/207.25 |
| 2008/0007251 | A1 * | 1/2008 | Lee .......................... 324/207.17 |
| 2010/0194385 | A1 * | 8/2010 | Ronnat et al. ........... 324/207.25 |
| 2011/0080162 | A1 * | 4/2011 | Steinich et al. .......... 324/207.25 |
| 2011/0126639 | A1 * | 6/2011 | Behrens .................. 73/862.193 |
| 2011/0169483 | A1 * | 7/2011 | Saito et al. .............. 324/207.25 |

FOREIGN PATENT DOCUMENTS

| DE | 195 06 938 | 8/1996 |
| DE | 10 2005 031 086 | 1/2007 |
| DE | 10 2008 011 448 | 9/2009 |

* cited by examiner

*Primary Examiner* — Lisa Caputo
*Assistant Examiner* — Jonathan Dunlap
(74) *Attorney, Agent, or Firm* — Kenyon & Kenyon LLP

(57) ABSTRACT

A sensor system has a rotational angle sensor for detecting a rotational angle and a torque sensor for detecting a torque. The rotational angle sensor has a rotatable rotational angle transmitter having index elements. The torque sensor has a rotatable torque transmitter having magnets, which generate a magnetic field, and a magnetic flux unit for amplifying the magnetic field. The index elements and the magnetic flux unit are connected to one another in a rotationally fixed manner.

18 Claims, 10 Drawing Sheets

SENSOR SYSTEM

BACKGROUND OF THE INVENTION

1. Field of the Invention

The present invention relates to a sensor system, which includes a rotational angle sensor and a torque sensor, and a method for detecting a rotational angle and a torque.

2. Description of Related Art

In electronic steering systems or EPS (electric power steering) systems, a measurement of the torque on the steering wheel is required. The torque or steering moment, which the driver generates on the steering wheel, results in twisting of a torsion bar by an angle proportional to the torque, which is measured by a torque sensor (TSS, torque steering sensor). EPS systems have significant advantages over typical hydraulic-based steering support systems, which is why these are expected to be completely replaced by EPS steering systems in the future.

The measurement of the rotational or steering angle is required, for example, for the ESP (electronic stability program). All vehicle classes are increasingly being equipped with steering angle sensors due to the propagation of the ESP as a fixed component of accident avoidance systems. Steering angle information is also used in other systems, such as PP (park pilot), ACC (adaptive cruise control), 4WD (four-wheel-drive), DDD (driver drowsiness detection), etc. Different requirements are placed on a steering angle measurement depending on the vehicle equipment. A steering angle sensor (LWS) of Robert Bosch GmbH having high resolution and precision is, for example, the LWS5 (class 111 sensor).

In some torque angle sensors (TAS), concepts for measuring the torque based on induction coils, sliding contacts, or magnetic circuits are used. The individual parts of rotational angle and torque sensors are typically based on magnetic principles. In a torque sensor, an index signal is integrated as an additional element, which provides a switching pulse when the steering is in the "drive straight ahead position." Gear wheels are used for angle recognition in steering angle sensor LWS5 of Robert Bosch GmbH.

A sensor system for detecting a differential angle is described in the published German patent application document DE 10 2005 031 086 A1. The sensor system includes at least one magnetic-field-sensitive sensor element, using which the magnetic field information of a magnetic circuit, which has a magnetic pole wheel connectable to a shaft and ferromagnetic flux rings having teeth, may be analyzed. The teeth run in the radial direction of the shaft for radially picking off the magnetic field information of the magnetic pole wheel.

The published German patent application document DE 195 06 938 A1 describes a method and a device for measuring the angle of a body rotatable by more than 360°. In this case, this rotatable body cooperates with at least two other rotatable gear wheels, whose angular position is ascertained with the aid of two sensors. The angle location of the rotatable body is determined from the angular positions thus ascertained. In order for definite statements to be possible, it is necessary for all three rotatable bodies or gear wheels to have specific predefinable tooth counts. The method and the device may be used to ascertain the steering angle of a motor vehicle, for example.

A system for detecting rotational angles on a rotating component having transmitters and sensors is described in the published German patent application document DE 10 2008 011 448, which detects changes of a physical variable generated by the transmitters as a function of the rotational angle change of the rotating component as signals which may be digitally analyzed. The rotating component has at least one satellite of smaller circumference, which is coupled to its circumference and rotates through its rotation, preferably having an angle sensor. The satellite drives, via an axially coupled hypocycloid gear, a hypocycloid disk or hypocycloid gear wheel which also rotates, whose rotational velocity may be stepped down by the hypocycloid gear in such a way that a revolution speed of the rotating component and the absolute steering angle over multiple revolutions of the steering shaft may be determined therefrom.

BRIEF SUMMARY OF THE INVENTION

In one embodiment of the present invention, a sensor system as a combined torque and rotational angle sensor, typically for a steering system of a motor vehicle, is provided, which may also be referred to as a torque-angle sensor (TAS) and therefore as a combination of a torque or steering torque sensor (TSS) and a rotational angle sensor (LWS). A steering angle may also be ascertained via the rotational angle sensor.

In one embodiment of the sensor system, instead of an index magnet on a magnetic flux unit (FTU, flux tube unit), a ring designed as a multi-pole wheel, which includes magnets situated in a circle as index elements, is fastened on the upper edge of the FTU. The ring is designed in accordance with an LWS principle, whose diameter may be adapted to the particular application. A printed circuit board of the TSS is additionally equipped with two, three, or four index ICs or index circuits as magnetic-field-sensitive sensors, which form torque pickups. These ICs are designed as Hall elements or Hall switches, Hall ICs in short, which turn on or off at a defined magnetic field strength. An incremental steering angle sensor may already be constructed with the aid of two index ICs. The precision of the sensor system increases with the number of the ICs on the printed circuit board. Switching information of the ICs is analyzed in a control unit which cooperates with the sensor system.

In addition, it may optionally be provided that errors of a signal for the torque regarding the steering angle are programmed into the control unit. These errors are compensated for by a rotational angle or steering angle information.

All ICs communicate via a line pair with a control unit, which cooperates with the sensor system to analyze signals of the rotational angle sensor and the torque sensor, through a bus circuit, e.g., PSIS synchronous.

In one embodiment of the present invention, it is provided that at least one first ring, as a torque transmitter of the torque sensor, has magnets situated in a circle as index elements, which form a multi-pole wheel as a whole, which may also be referred to as a magnet unit. During a rotation of this multi-pole wheel about an axis, a rotating magnetic field is provided, which is formed by superposition of the individual magnetic fields of the magnets. This magnetic field is amplified by a magnetic flux unit as an additional component of the torque sensor. The magnetic flux unit is situated coaxially to the axis, typically axially offset to the multi-pole wheel, and includes two rings made of ferromagnetic material, for example.

In one specific embodiment of the method according to the present invention, the first ring, as the torque transmitter, and the magnetic flux unit are rotated relative to one another about the axis. A differential angle results between the first ring and the magnetic flux unit and accordingly a relative angle which is proportional to the torque to be ascertained.

The amplified magnetic field is detected by at least one magnetic-field-sensitive sensor of the torque sensor, which is designed as a Hall switch. A signal which is provided by the at least one Hall switch is relayed to a control unit, which cooperates with the sensor system, to determine the torque. At least two Hall switches are typically provided as magnetic-field-sensitive sensors for detecting the magnetic field. It is therefore possible that the control unit may compare the redundant signals provided by the at least two Hall switches and may recognize a possibly present erroneous signal of at least one of the Hall switches.

If a rotational angle transmitter, which is designed as a multi-pole wheel, which includes a ring made of magnets as index elements, is used to determine the rotational angle with the aid of the torque sensor, the magnetic field provided upon rotation of the multi-pole wheel, which also rotates, is detected by at least one rotational angle pickup, which is also designed as a Hall switch, this at least one Hall switch being situated fixed in place to the rotating multi-pole wheel as a magnetic-field-sensitive sensor. In the event of a pole change, which is created by the rotating magnetic field, the at least one Hall switch changes its switching state. On the basis of the rotating magnetic field detected by the at least one Hall switch, the Hall switch provides a signal and also relays it to the control unit.

It is provided in this case that the magnetic flux unit of the torque sensor and the index elements of the rotational angle sensor, which are designed as magnets, for example, are structurally combined and are typically connected to one another in a rotationally fixed manner. During the analysis of the signal for the rotational angle, the control unit may also count the pole changes of the rotating magnets and use the result to calculate the rotational angle of the multi-pole wheel of the rotational angle sensor. In this case, the rotational angle is counted incrementally. However, it may also be provided that at least two rotational angle pickups designed as Hall switches are used for detecting the magnetic field of the multi-pole wheel, so that the rotational angle may also be redundantly determined.

The rotational angle may alternatively be determined by detecting a second physical variable. For this purpose, it may be provided that the magnetic flux unit is combined with a second ring as a rotational angle transmitter, which is designed as a first gear wheel. Here, the magnetic flux unit and the first gear wheel are connected to one another in a rotationally fixed manner. In this case, the rotational angle sensor for determining the rotational angle has at least one rotational angle pickup, which is designed as a second gear wheel, teeth of the first gear wheel of the rotational angle transmitter meshing into the teeth of the at least one second gear wheel as the rotational angle pickup. Accordingly, in the event of a rotation of the first gear wheel of the rotational angle pickup, the at least one second gear wheel of the rotational angle pickup is also set into rotation. Furthermore, a rotational movement of the at least one second gear wheel is detected, and a signal is produced therefrom and relayed to the control unit for the calculation of the rotational angle.

In one embodiment, the rotational angle sensor for determining the rotational angle may include at least two second gear wheels as rotational angle pickups, whose teeth mesh into the teeth of the first gear wheel of the rotational angle transmitter, so that in the event of a rotation of the first gear wheel of the rotational angle transmitter, the at least two second gear wheels are also set into rotation as rotational angle pickups of the rotational angle sensor. Through the multiple embodiments of the second gear wheels of the rotational angle sensor, it is possible to also redundantly detect the rotational angle.

To determine a rotational movement of the at least one second gear wheel of the rotational angle sensor, a magnet may be situated in this gear wheel, whose rotation is also detected by a Hall switch, so that a signal is produced therefrom and relayed to the control unit for further analysis.

In another embodiment, the at least one second gear wheel of the rotational angle sensor may drive a hypocycloid disc or a hypocycloid gear wheel, which is also rotatable, via an axially coupled hypocycloid gear. In this case, a rotational velocity is stepped down by the hypocycloid gear, a resulting speed of the rotating first gear wheel of the rotational angle sensor and an absolute rotational angle being able to be ascertained, typically over multiple revolutions of the first gear wheel.

In another embodiment of the present invention, the second ring of the rotational angle sensor may have markings as index elements, which are situated circularly on an outer wall, e.g., on an outer wall of the multi-pole wheel of the rotational angle sensor. A movement of these markings as index elements may be optically detected by at least one optical sensor, such as a photocell, signals of this at least one optical sensor being relayed to the control unit to determine the rotational angle. At least two optical sensors may also be provided as rotational angle pickups in this case, so that a redundant determination of the rotational angle by the rotational angle sensor is also possible here.

The combination of the LWS6 of Robert Bosch GmbH and the TSS which is provided in the scope of the present invention allows a compact construction of a function for torque measurement and rotational angle measurement. A small overall size, inter alia, in the radial orientation of the sensor system, results through this construction. In addition, the use of standard components of the LWS6 and the TSS is possible. Furthermore, the compensation for the rotation errors of the TSS by compensation using an angle signal and a reduction of plug connections when using a bus system are possible.

No friction bearings are required for the sensor system in one embodiment. A TSS function therefore remains contactless. In addition, a second installation location for the LWS on the steering column, which includes the steering shaft, is not necessary. A higher degree of functional reliability results through plausibility checks of the signals in the sensor system.

Both measurements for the torque and the rotational angle may be combined with the aid of the present invention in one sensor system, which includes the rotational angle sensor and the torque sensor. The sensor system according to the present invention has a smaller diameter. In addition, the installation dimensions may be decreased overall and costs may be reduced. It is possible to use standard components of the TSS and the LWS6. At least one multi-pole wheel, which may be used at least as a torque transmitter and also as a rotational angle transmitter, includes high resolution parts as index elements, which are implemented by the magnets from which the at least one multi-pole wheel is formed, and are desirable for torque and optionally also steering angle requirements.

The combination of the rotational angle and torque sensor also allows synergies in the signal transmission of the signals for the rotational angle and the torque. Compensation algorithms may thus be used to improve the signal for the rotational angle and the signal for the torque.

In one embodiment of the sensor system according to the present invention, only one shared printed circuit board is necessary for the torque sensor and the steering angle sensor. Only one plug and one cable are necessary to send both signals detected by the rotational angle pickup and the torque pickup to the control unit.

Therefore, in one specific embodiment of the present invention, a rotational angle sensor and a torque sensor are combined modularly to form a rotational angle and torque sensor, which may also be referred to as a steering angle and torque sensor in the automotive field. The signal of the torque may have deviations over the steering angle. If the deviations are known, e.g., by prior learning or teaching, the deviation in the signal for the torque may be compensated for using the steering angle information.

In the combination provided in the scope of the present invention, the torque sensor has a friction bearing between the magnetic flux unit and the torque pickup, which is also referred to as a sensor unit. The magnetic flux unit and the sensor unit are therefore no longer contactless. Through this placing it is possible to injection mold an annular gear onto the magnetic flux unit or optionally onto the magnet unit, which is designed as a multi-pole wheel, and to thus provide the first gear wheel. The sensor unit, as the rotational angle pickup for ascertaining the rotational angle, includes two second gear wheels having different teeth counts, which mesh into the annular gear on the magnetic flux unit or magnet unit. The steering angle position may be ascertained with the aid of this combination in consideration of a calculation algorithm of the LWS5.

The sensor system according to the present invention is designed for the purpose of carrying out all steps of the presented method. Individual steps of this method may also be carried out by individual components of the sensor system. Furthermore, functions of the sensor system or functions of individual components of the sensor system may be implemented as steps of the method. In addition, it is possible that steps of the method are implemented as functions of at least one component of the sensor system or of the entire sensor system.

It is understood that the above-mentioned features and the features to be explained hereafter are usable not only in the particular specified combination, but rather also in other combinations or alone, without leaving the scope of the present invention.

DETAILED DESCRIPTION OF THE INVENTION

Figure 1:
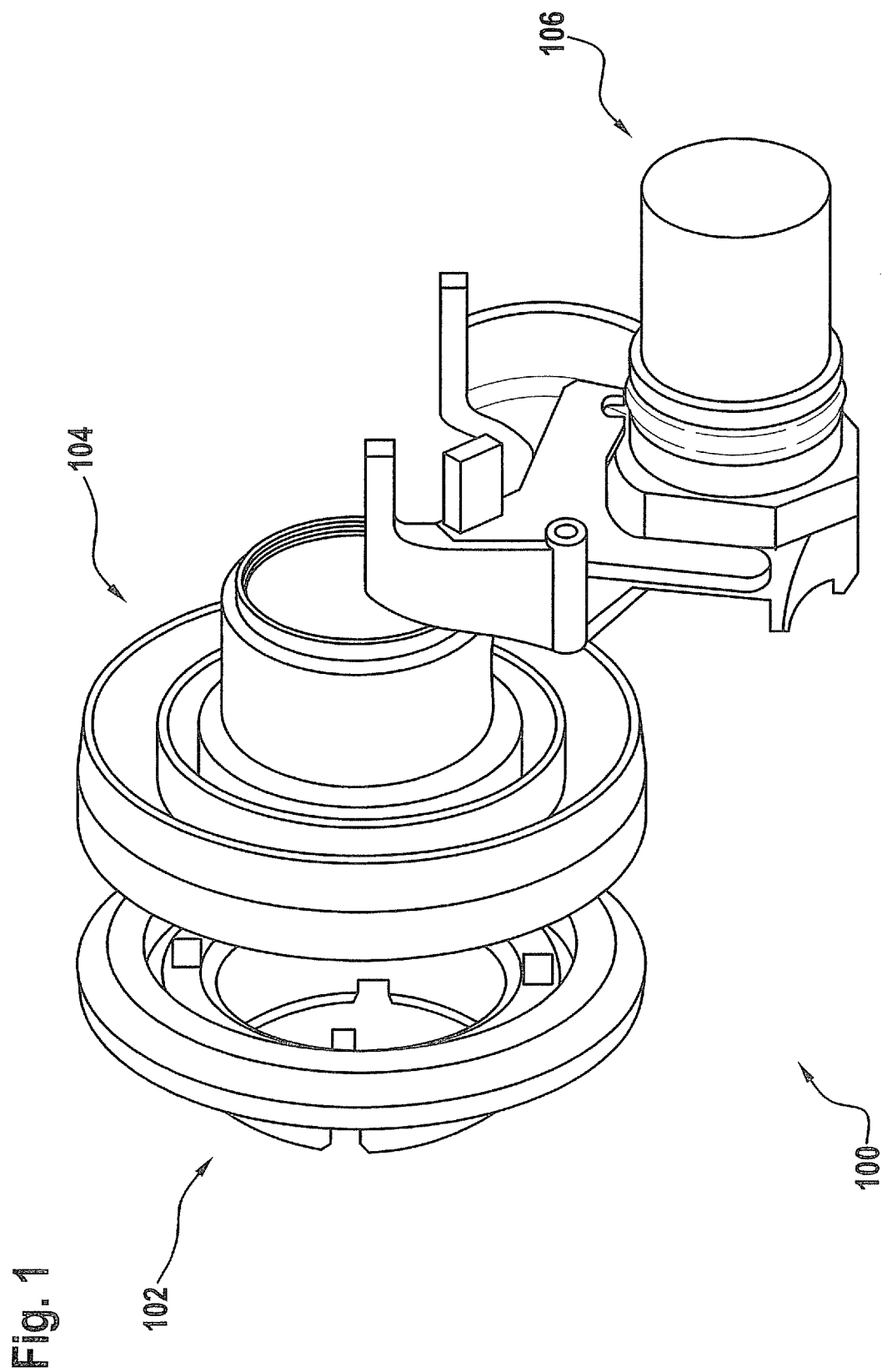
FIG. 1 shows a schematic view of an example of a torque sensor (TSS) known from the related art.

The present invention is shown schematically in the drawings on the basis of specific embodiments and is described in greater detail hereafter with reference to the drawings.

The figures are described coherently and comprehensively; identical reference numerals identify identical components.

Torque sensor 100, which is schematically shown in FIG. 1 and is known from the related art, includes three components, which, assembled with a torsion bar and a housing (not shown here in greater detail), allow the measurement of the torque. The components are a magnet unit 102 (MU), a magnetic flux unit 104 (FTU, flux tube unit), and a sensor unit 106 (SU). In this case, magnet unit 102 is fastened on a first shaft (not shown in FIG. 1), and magnetic flux unit 104 is fastened on a second shaft (not shown in FIG. 1). Sensor unit 106 is fastened fixed in place next to magnetic flux unit 104. The two mentioned shafts are connected to one another via the torsion bar and may rotate relative to one another via a common axis, a torque being generated by twisting the torsion bar. A magnetic field is generated by magnet unit 102, which includes a collar of magnets and is accordingly designed as a multi-pole wheel, the magnetic field being amplified by magnetic flux unit 104 and being detected by sensor unit 106 to determine the torque.

Figure 2:
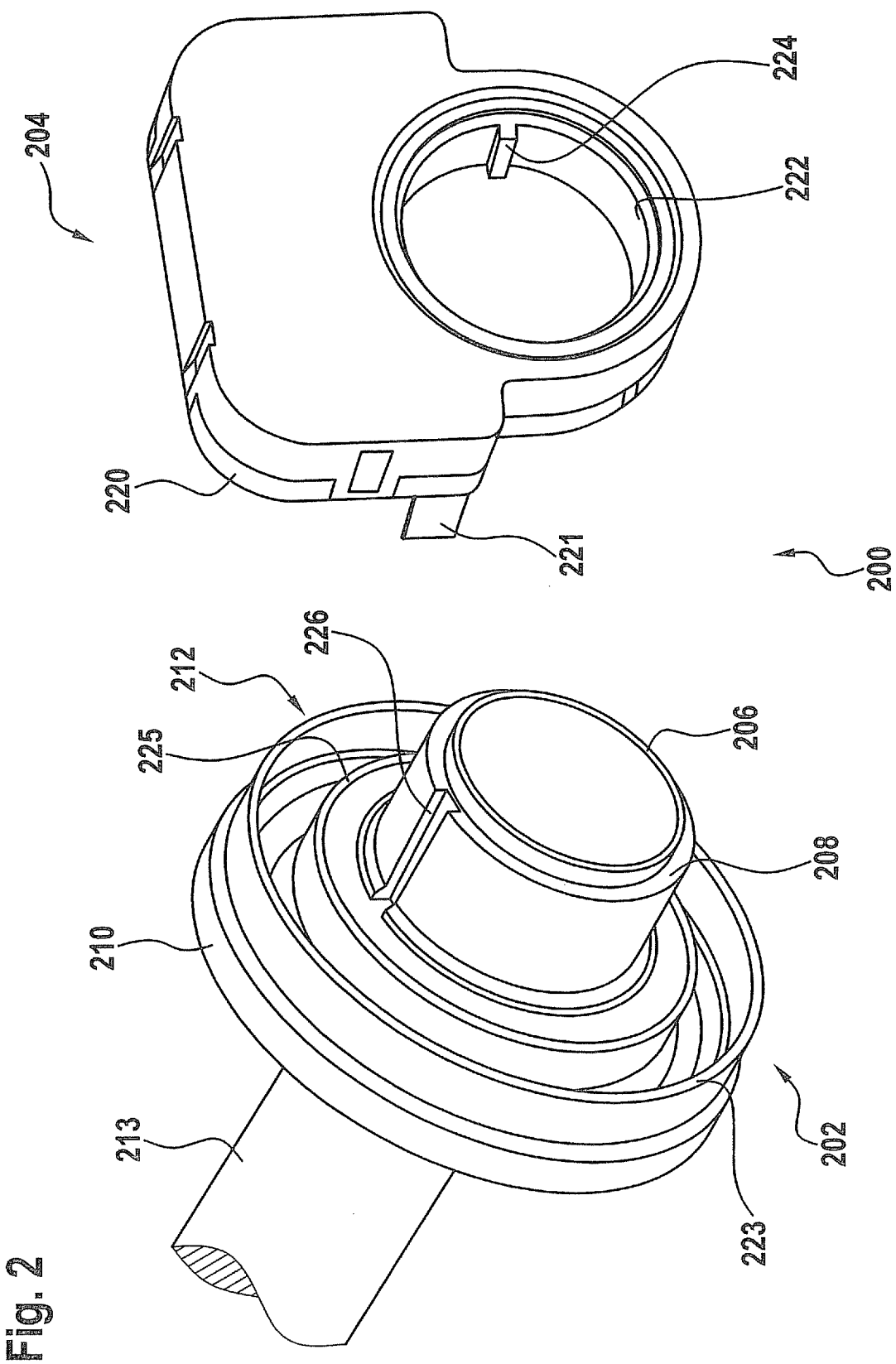
FIG. 2 shows a schematic view of components of a first specific embodiment of a sensor system according to the present invention.

The first specific embodiment of a sensor system 200 according to the present invention, which is schematically shown in FIG. 2, includes a torque sensor and a rotational angle sensor. The torque sensor and the rotational angle sensor are implemented here by a transmitter system 202 and a receiver system 204, which are shown separately from one another in FIG. 2 for a better overview. FIG. 2 also shows a first shaft 206 designed as a steering shaft.

In the illustrated specific embodiment of sensor system 200, first shaft 206 is enclosed by a sleeve 208, sleeve 208 and shaft 206 being connected to one another in a rotationally fixed manner. Transmitter system 202 includes a magnet unit 210 (MU) and a magnetic flux unit 212 (FTU) as the torque transmitter. Magnet unit 210, which is designed here as a multi-pole wheel, includes magnets situated in a ring. Magnet unit 210 is connected to a second shaft 213 in a rotationally fixed manner. The two shafts 206, 213 are connected to one another via a torsion bar, which is concealed here by transmitter system 202, and may rotate relative to one another about a common axis.

Magnetic flux unit 212, which is also designed as a ring, is made of ferromagnetic material and amplifies magnetic fields of the magnets of magnet unit 210. It is provided here that magnetic flux unit 212 is connected in a rotationally fixed manner to first shaft 206 and therefore to sleeve 208, while in contrast receiver system 204 is connected to a fixed component (not shown in greater detail here).

Furthermore, FIG. 2 shows a connection of transmitter system 202 to receiver system 204, a large gear wheel 222 being inserted with the aid of a lug 224 into a groove 226 of sleeve 208. Transmitter system 202 and receiver system 204 are therefore connected to one another, so that a rotation of magnetic flux unit 212 relative to second shaft 213 is also transmitted to large gear wheel 222.

In addition, receiver system 204 includes a housing 220, on which a Hall switch 221 is situated as a torque pickup to determine a torque. In an assembled state of sensor system 200, this Hall switch 221 is situated between a first outer ring 223 and a second inner ring 225 as components of magnetic flux unit 212, which are both situated coaxially to one another and are made of ferromagnetic material.

In the event of a rotation of first shaft 206 relative to second shaft 213 about the common axis, a differential angle results between these two shafts 206, 213. Furthermore, the torsion bar, via which the two shafts 206, 213 are connected to one another, is twisted, thus resulting in a torque, which is proportional to the differential angle between the two shafts 206, 213. Furthermore, this also results in magnet unit 210 rotating relative to the two rings 223, 225 of magnetic flux unit 212. A magnetic field which is generated by the magnets of magnet unit 210 is amplified by the two rings 223, 225 of magnetic flux unit 212. This amplified magnetic field is detected by Hall switch 221. It is therefore possible to detect a relative rotation of first shaft 206 to second shaft 213 via Hall switch 221, from which a signal for determining the torque is in turn provided.

In addition, gear wheel 222, which is designed as a rotational angle transmitter, has lug 224 on the inner wall as a component of receiver system 204. First sleeve 208, as a component of transmitter system 202, in contrast, includes groove 226 on the outer wall. In an assembled state of sensor system 200, lug 224 is inserted into groove 226. Sleeves 208 and first gear wheel 222 therefore form a hub overall. Sleeve 208 and gear wheel 222 are radially fixed with one another via the hub, i.e., via the connection formed from lug 224 and groove 226. However, other rotationally fixed connections between sleeve 208 and gear wheel 222, for example, latching, are also conceivable. A rotation of shaft 206 is therefore transmitted to gear wheel 222, which therefore rotates in the same way as shaft 206 to the housing 220, which is fastened on a component (not shown).

Figure 3:
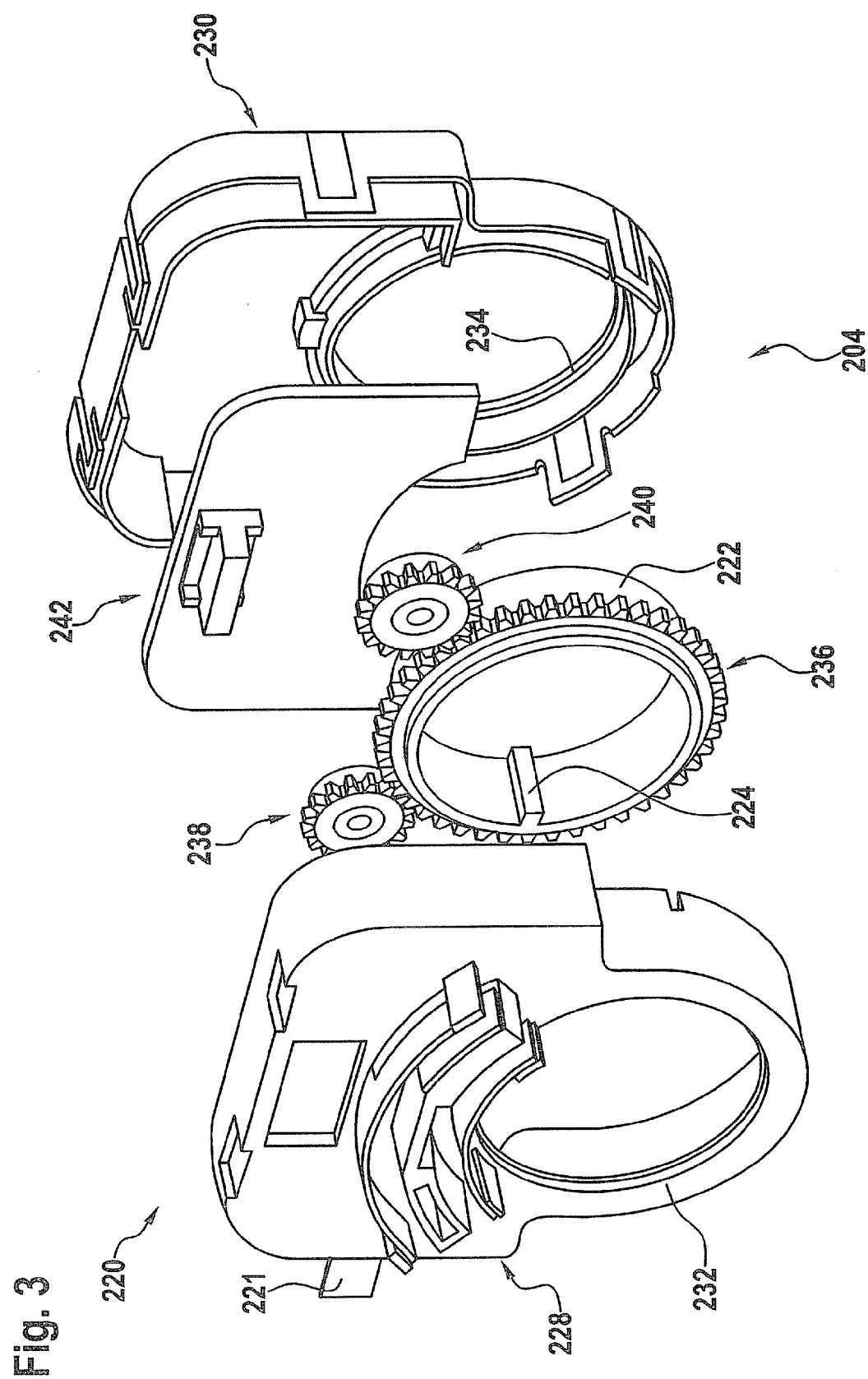
FIG. 3 shows details of a component of the sensor system from FIG. 2.

FIG. 3 shows a schematic view of receiver system 204 from FIG. 2 having open housing 220. This housing 220 includes a first housing part 228 and a second housing part 230. Gear wheel 222 is situated between circular openings 232, 234 of housing parts 228, 230 and is received by housing parts 228, 230 in such a way that it is rotatable relative to housing 220. FIG. 3 also shows that gear wheel 222 has an annular gear 236, which encloses an outer wall of gear wheel 222 in the form of a ring or collar. Teeth of gear wheel 222 form index elements for detecting a rotational angle of first shaft 206.

Receiver system 204 includes two small gear wheels 238, 240 inside housing 220, each of these small gear wheels 238, 240 having a magnet. In addition, a printed circuit board 242 is situated inside housing 220 of receiver system 204, which includes two magnetic-field-sensitive sensors (not shown in greater detail), a first such magnetic-field-sensitive sensor being spatially assigned to a first small gear wheel 238 having the magnets and a second magnetic-field-sensitive sensor being spatially assigned to a second small gear wheel 240 having the magnets. In addition, it is provided that, as index elements, teeth of large gear wheel 222, as the rotational angle transmitter, mesh into teeth of the two small gear wheels 238, 240 as the rotational angle pickups. This results in small gear wheels 238, 240 contacting large gear wheel 222 as wheels, which is assigned to shaft 206 as a contact component.

In the event of a rotation of shaft 206, first sleeve 208 is rotated via the hub, which is formed from lug 224 and groove 226, and therefore large gear wheel 222, which is connected in a rotationally fixed manner to sleeve 208. This in turn has the result that the two small gear wheels 238, 240, which cooperate with large gear wheel 222, are also rotated. Furthermore, this has the result that the magnets in the two small gear wheels 238, 240 are rotated relative to the magnetic-field-sensitive sensors as components of printed circuit board 242. The absolute steering or rotational angle of shaft 206 is to be determined via orientations of the magnetic fields of the magnets in small gear wheels 238, 240 with the aid of the magnetic-field-sensitive sensors inside printed circuit board 242.

Figure 4:
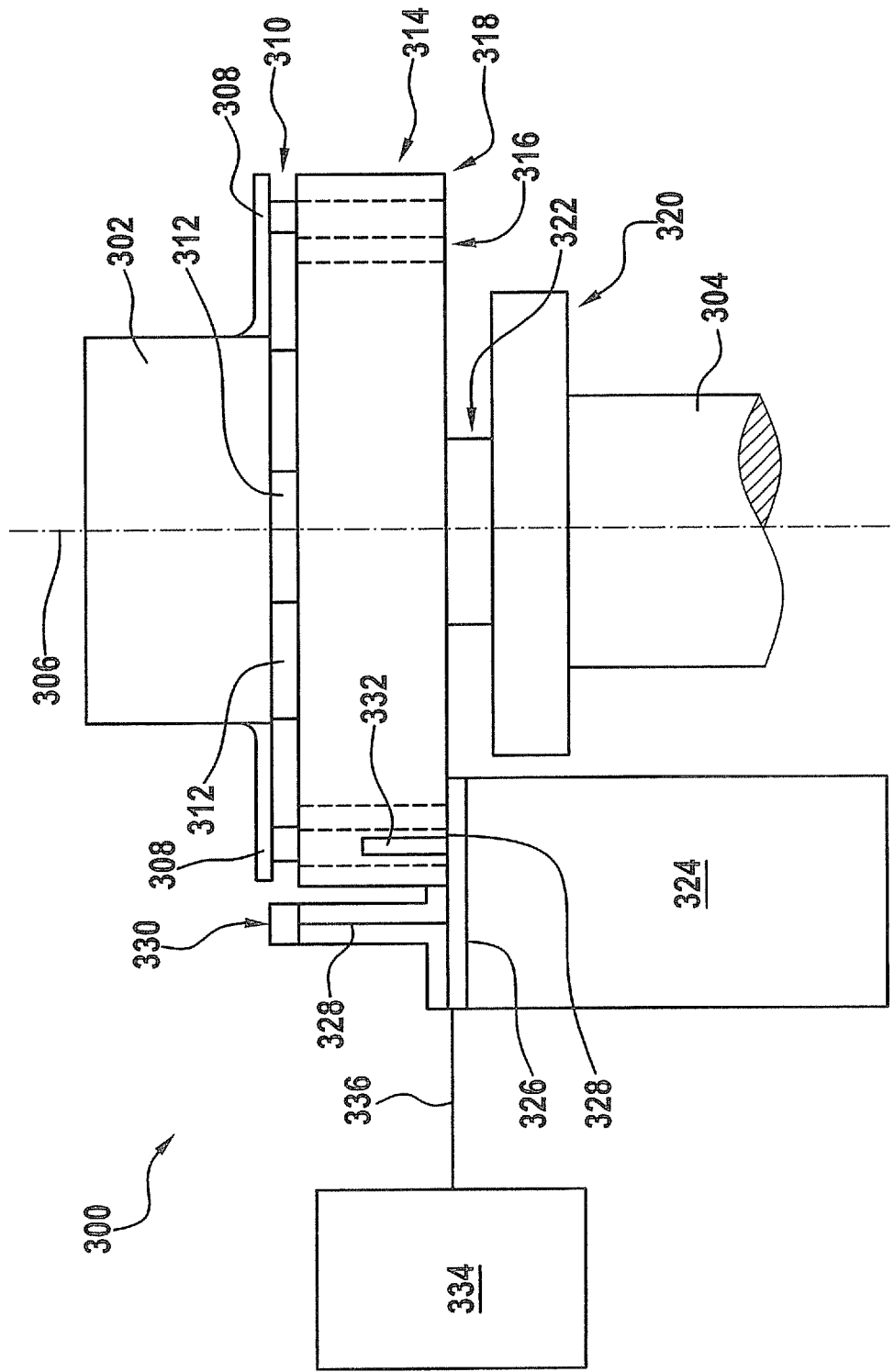
FIG. 4 shows a schematic view of a detail of a second specific embodiment of a sensor system according to the present invention.

FIG. 4 shows a schematic view of a second specific embodiment of a sensor system 300 according to the present invention, using which a rotational angle of a first shaft 302, which is also schematically shown in FIG. 4, may be ascertained.

Furthermore, this sensor system 300 is also designed to ascertain a differential angle of first shaft 302 to a second shaft 304, these two shafts 302, 304 being rotatable relative to one another via a common axis 306. In addition, these two shafts 302, 304 are connected to one another via a torsion bar, which is concealed by sensor system 300 in FIG. 4. In the event of a relative rotation of first shaft 302 relative to second shaft 304, the mentioned torsion bar is twisted, causing a torque to be generated, which results from the differential angle of the two shafts 302, 304 rotating relative to one another, and may be ascertained using the second specific embodiment of sensor system 300 according to the present invention shown in FIG. 4.

In addition, FIG. 4 shows a sleeve 308 fastened on first shaft 302, on which a multi-pole wheel 310 is fastened as a rotational angle transmitter. Multi-pole wheel 310, which is connected to sleeve 308 in a rotationally fixed manner, includes multiple magnets 312 situated in a circle or ring as index elements. Furthermore, in addition to multi-pole wheel 310, a magnetic flux unit 314 is fastened on sleeve 308 and therefore connected in a rotationally fixed manner, which includes two rings 316, 318 situated here coaxially to one another, which are made of ferromagnetic material.

Furthermore, FIG. 4 shows a magnet unit 320 fastened on second shaft 304 as a torque transmitter. The two shafts 302, 304 are additionally connected to one another via a torsion bar 322. A component 324 is situated fixed in place in the system shown on the basis of FIG. 4, so that the two shafts 302, 304 may rotate relative to this component 324 about their common axis 306.

A printed circuit board 326 is situated on fixed component 324, which is connected via connections 328 to a first magnetic-field-sensitive sensor 330, which is designed here as a rotational angle pickup, and to a second magnetic-field-sensitive sensor 332, which is designed here as a torque pickup. These two magnetic-field-sensitive sensors 330, 332 are also fastened on fixed component 324.

Furthermore, FIG. 4 shows a control unit 334, which is connected via a line 336 to printed circuit board 326 and therefore also to the two magnetic-field-sensitive sensors 330, 332 via printed circuit board 326.

The second specific embodiment of sensor system 300 according to the present invention, which is illustrated on the basis of FIG. 4, includes a rotational angle sensor and a torque sensor. In this case, the rotational angle sensor includes multi-pole wheel 310 as a rotational angle transmitter, which includes magnets 312 as index elements and is fastened on sleeve 308. In addition, the rotational angle sensor includes first magnetic-field-sensitive sensor 330, which is fastened on component 324. In the event of a rotation of first shaft 302 about axis 306 relative to component 324, a rotational angle of first shaft 302 is detected with the aid of the rotational angle sensor. It is provided in this case that a magnetic field generated by magnets 312 is detected by first magnetic-field-sensitive sensor 330 as the rotational angle pickup. In the event of a rotation of shaft 302 about axis 306, a pole change in magnetic-field-sensitive sensor 330 is induced by magnets 312, which also rotate. In addition, first magnetic-field-sensitive sensor 330 transmits a signal via connection 328 to printed circuit board 326, which is transmitted from printed circuit board 326 via line 336 to control unit 334 and analyzed thereby, control unit 334 ascertaining by calculation the rotational angle of first shaft 302 based on the transmitted signal of first magnetic-field-sensitive sensor 330.

The torque sensor of the specific embodiment of sensor system 300 according to the present invention shown here includes magnet unit 320 fastened on second shaft 304, which also includes circularly situated magnets, which also generate a magnetic field. A magnetic flux unit 314 and, as the torque pickup, second magnetic-field sensitive sensor 332, which is situated between the two rings 316, 318 of magnetic flux unit 314, are provided as further components of the torque sensor. Using this torque pickup it is possible to detect a differential angle between first shaft 302 and second shaft 304 when these two shafts 302, 304 rotate relative to one another about common axis 306.

To detect the torque, a magnetic field, which is generated by magnet unit 320 as the torque transmitter, is amplified by the two rings 316, 318 of magnetic flux unit 314. This amplified magnetic field is detected by second magnetic-field-sensitive sensor 332, which is designed as a torque pickup. A signal, which is generated by second magnetic-field-sensitive sensor 332 based on this detected magnetic field, is also transmitted via connection 328 to printed circuit board 326 and from printed circuit board 326 via line 336 to control unit 334. The signal of second magnetic-field-sensitive sensor 332 received by control unit 334 is analyzed by control unit 334, control unit 334 ascertaining the torque, which is proportional to the differential angle of the two shafts 302, 304, from this signal of second magnetic-field-sensitive sensor 332 by calculation.

It is typically provided that control unit 334 cooperates with the specific embodiment of sensor system 300 shown here. However, it is also possible that control unit 334 may also be provided as a component of sensor system 300, depending on the definition. In sensor system 300, magnets 312, as the index elements of the rotational angle transmitter, and magnetic flux unit 314 are connected to one another in a rotationally fixed manner.

Figure 5A:
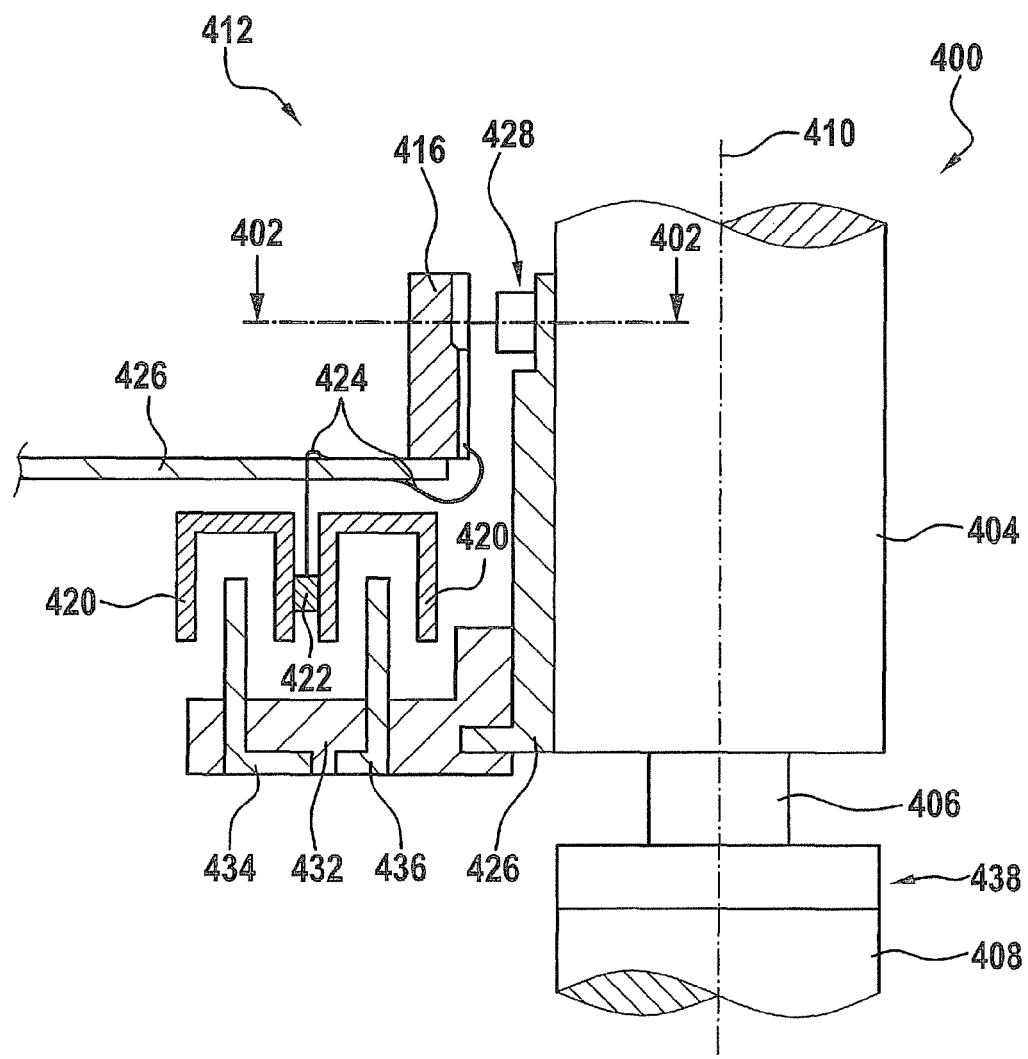
FIG. 5 shows a schematic view of a detail of a third specific embodiment of a sensor system according to the present invention.
Figure 5B:
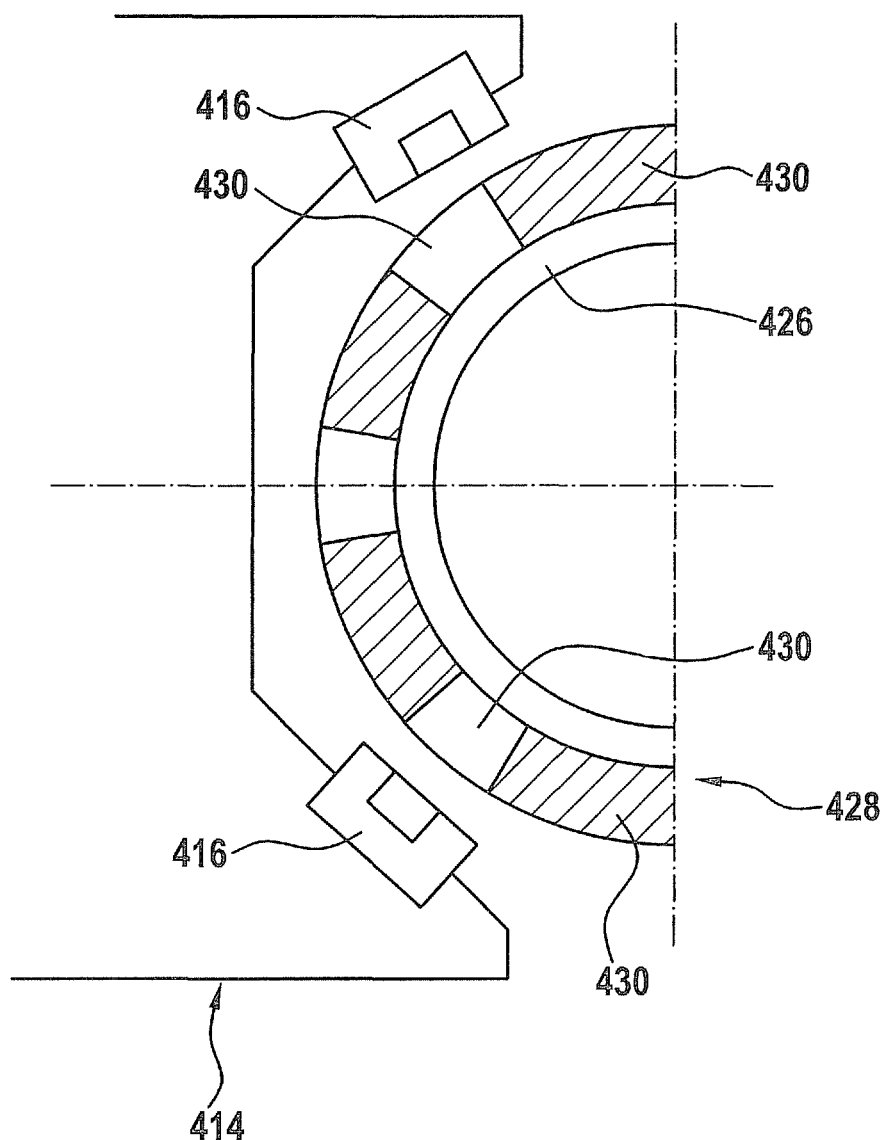

A third specific embodiment of a sensor system 400 according to the present invention for detecting a rotational angle and a torque is schematically shown in FIG. 5. Here, FIG. 5a shows this sensor system 400 in a lateral view and FIG. 5b shows a section through sensor system 400 along line 402-402.

Furthermore, FIG. 5 shows a first shaft 404, which is connected via a torsion bar 406 to a second shaft 408. These two shafts 404, 408 may rotate about a common axis 410 relative to a component 412, which is situated fixed in place, and is situated here next to first shaft 404, and also relative to one another. Two rotational angle pickups, which are designed as Hall switches 416, are fastened on component 412.

In addition, a further Hall switch 422 is fastened on the component as a torque pickup, which is situated between two collectors 420. It is provided that all Hall switches 416, 422 are connected via connections 424, which are designed here as cables, to a printed circuit board 426 (PCB, printed circuit board).

In the specific embodiment of sensor system 400 described here, a sleeve 426 is connected to first shaft 404. In this case, a ring, which is designed as a multi-pole wheel 428, and which includes multiple magnets 430 as index elements, is situated on sleeve 426 in an upper area. A magnetic flux unit 432, which includes two rings 434, 436 situated coaxially to one another, which are made of ferromagnetic material, is fastened in a lower area of sleeve 426, second Hall switch 422 being situated between these two rings 434, 436.

In the event of a rotation of first shaft 404 about axis 410, multi-pole wheel 428 made of magnets 430 and the two rings 434, 436 of magnetic flux unit 432 may rotate relative to component 412. A magnetic field, which is generated by magnets 430 of multi-pole wheel 428, is detected in the event of a rotation of first shaft 404 about axis 410 with the aid of the two first Hall switches 416. It is therefore possible to determine a rotational angle of first shaft 404 relative to component 412.

A magnet unit 438 as a torque transmitter which includes multiple magnets situated in the shape of a circle and/or collar is also fastened on an outer wall of second shaft 408. In contrast, magnets 430 of multi-pole wheel 428 and magnetic flux unit 432 are fastened rotationally fixed to one another on sleeve 426 and on first shaft 404.

In the event of a rotation of second shaft 408 relative to first shaft 404, the magnetic field, which is generated by magnet unit 438, rotates relative to the two rings 434, 436 of magnetic flux unit 432. The magnetic field, which is provided by magnet unit 438, is amplified by the two rings 434, 436 of magnetic flux unit 432, which are made of ferromagnetic material, and may therefore be detected by second Hall switch 422. It is therefore possible to ascertain a differential angle of a rotation of the two shafts 404, 408 relative to one another. As a result of the relative rotation of the two shafts 404, 408 to one another, torsion bar 406 is twisted between these two shafts 404, 408, a torque proportional to the differential angle being generated. This torque is detected in the specific embodiment of the sensor system according to the present invention shown here by second Hall switch 422.

Signals, which are generated by the two first Hall switches 416 and by second Hall switch 422 as the magnetic-field-sensitive sensors, are relayed via connections 424 to printed circuit board 426. Furthermore, this printed circuit board 426 is connected to a control unit (not shown), which further processes all signals of all Hall switches 416, 422 and ascertains the rotational angle and the torque from the detected signals.

Figure 6A:
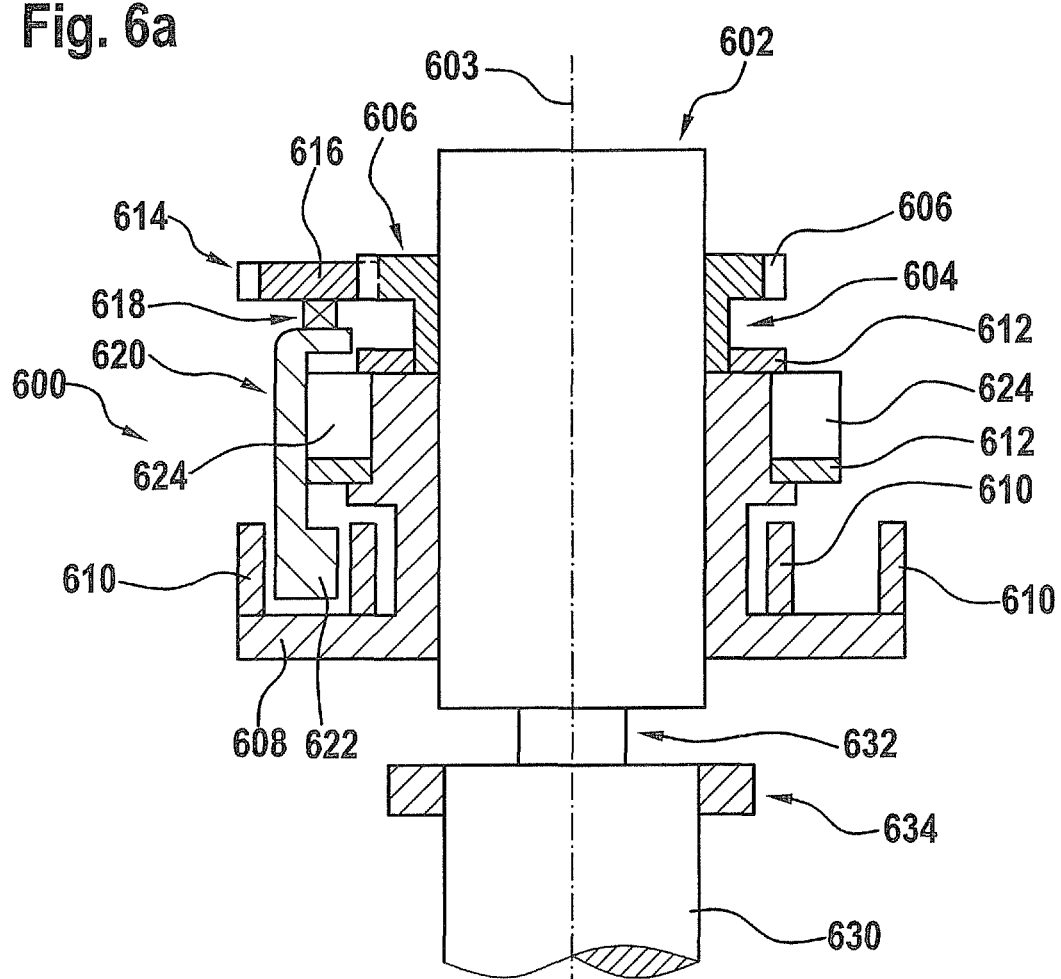
FIG. 6 shows a schematic view of a fourth specific embodiment of a sensor system according to the present invention.
Figure 6B:
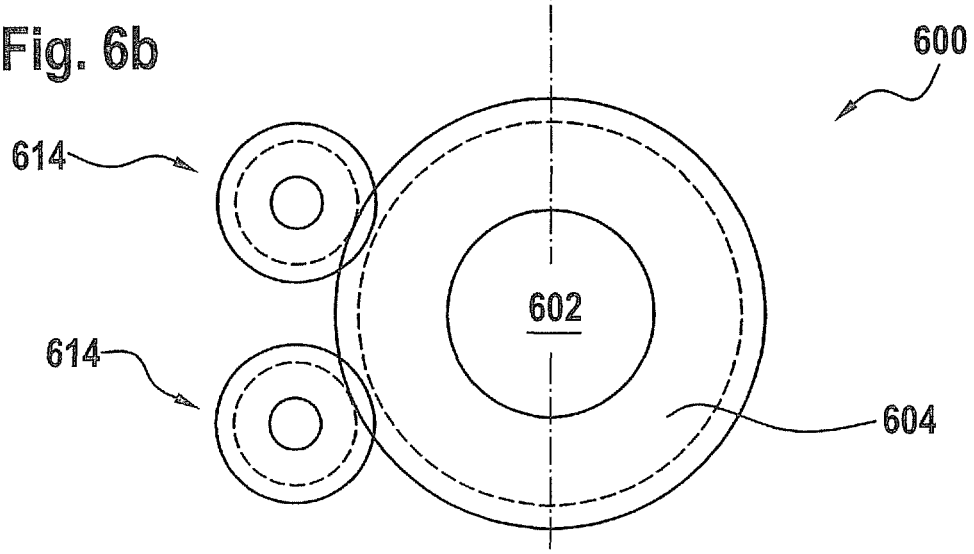

A fourth specific embodiment of a sensor system 600 according to the present invention is schematically shown in a sectional view in FIG. 6a and in a top view in FIG. 6b. In this case, FIG. 6 shows a first shaft 602, which is designed as a steering rod of a motor vehicle, and on which a sleeve 604 is fastened via a hub so it revolves coaxially. This first shaft 602 has an axis 603, about which first shaft 602 is rotatable. A revolving large gear wheel 606 as a rotational angle transmitter is fastened on sleeve 604 in an upper area and a magnetic flux unit 608 (FTU, flux tube unit) is fastened in a lower area. Magnetic flux unit 608, which is situated on sleeve 604, includes two coaxially situated rings 610, which are designed as flux conducting parts of magnetic flux unit 608. Two coaxially revolving clamping rings 612 are fastened in a middle area on sleeve 604. Accordingly, teeth of large gear wheel 606, which are provided as index elements of a rotational angle transmitter, and magnetic flux unit 608 are situated rotationally fixed to one another on sleeve 604 and therefore on first shaft 602.

In the event of operation of first shaft 602, it is provided that it rotates about its own axis 603 relative to a component (not shown in greater detail in FIG. 6). Two small gear wheels 614 as rotational angle pickups are rotatably fastened on this component. In this case, a magnet 616 is situated in each of these small gear wheels 614. Furthermore, the teeth of small gear wheels 614 mesh into the teeth of large gear wheel 606 on sleeve 604 of shaft 602. It is provided that the teeth of large gear wheel 606 form index elements of the rotational angle transmitter.

In the event of a rotation of shaft 602, both small gear wheels 614 and magnets 616, which are situated in small gear wheels 614, are set into rotation by interaction with large gear wheel 606 and therefore the ring. The rotating changing magnetic fields of magnets 616 are detected by two magnetic-field-sensitive sensors 618, which are situated in a printed circuit board 620 below small gear wheels 614, which is in turn fastened on the component. One magnetic-field-sensitive sensor 618 is situated below each small gear wheel 614 and is designed as an AMR or Hall element or Hall sensor, for example. A rotational angle of first shaft 602 may be generated and ascertained by detection of the magnetic fields which rotate with small gear wheels 614, and which are generated by magnets 616. Another magnetic-field-sensitive sensor 622 as a torque pickup is fastened on a lower area of printed circuit board 620. Furthermore, FIG. 6a shows a friction bearing 624 situated between sleeve 604 and printed circuit board 620.

In addition, FIG. 6a shows a second shaft 630, which is rotatable about the same axis 603 as first shaft 602. These two shafts 602, 630 may also rotate relative to one another, a differential angle resulting between the two shafts 602, 630. In addition, these two shafts 602, 630 are connected to one another via a torsion bar 632. In the event of a rotation of the two shafts 602, 630 relative to one another, this torsion bar 632 is twisted, a torque being generated, which is proportional to the differential angle of the two shafts 602, 630 which are rotated relative to one another about common axis 603.

A magnet unit 634, which encloses second shaft 630, is fastened coaxially to second shaft 630. This magnet unit 634 is provided as a torque transmitter in the specific embodiment of sensor system 600 according to the present invention described here. Magnets, as index elements of magnet unit 634, generate a magnetic field which, in the event of a rotation of second shaft 630 relative to first shaft 602, also rotates relative to magnetic-field-sensitive sensor 622. The possibly rotating magnetic field which is generated by magnet unit 634 is amplified by both rings 610 of magnetic flux unit 608 and detected by magnetic-field-sensitive sensor 622 as the torque pickup. The differential angle between the two shafts 602, 630 is detected at the same time by detecting the rotating magnetic field of magnet unit 634. A signal which is derived by magnetic-field-sensitive sensor 622 from the detected magnetic field is transmitted to a control unit (not shown in greater detail here), which may calculate and therefore ascertain the torque based on the transmitted signal.

In illustrated sensor system 600, magnetic flux unit 608, which is fastened on shaft 602 of the steering column, is expanded by a hub. Two small gear wheels 614, which mesh with the hub, are mounted above printed circuit board 620. Magnetic-field-sensitive sensors 618, which are designed as AMR or planar Hall ICs, are situated below small gear wheels 614, the sensors detecting the location of magnets 616 in small gear wheels 614, whereby an angular position of the hub may be calculated.

Figure 7:
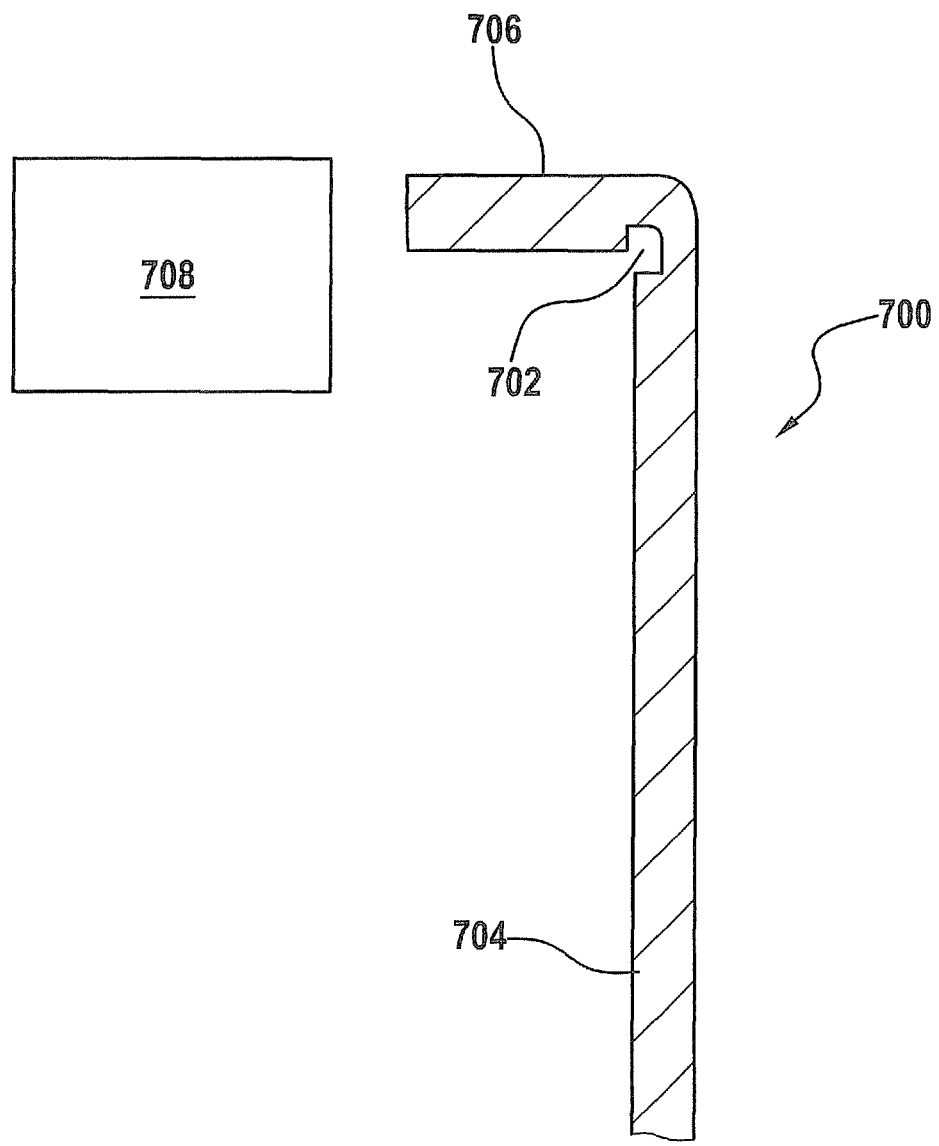
FIG. 7 shows a schematic view of a detail of the sensor system from FIG. 6.

FIG. 7 shows a schematic view of an example of a printed circuit board 700, as may be used in a specific embodiment of a sensor system according to the present invention, e.g., sensor system 600 from FIG. 6. It is provided that printed circuit board 700 is implemented as kinked. For this purpose, printed circuit board 700 has a depth milling 702 at one point, which allows printed circuit board 700 to kink by 90° at this point, so that printed circuit board 700 has an L-shaped profile. Overall, the illustrated specific embodiment of printed circuit board 700 includes a base printed circuit board 704 and a printed conductor section 706, in which printed conductors and magnetic-field-sensitive sensors 708, typically Hall elements, are situated. These magnetic-field-sensitive sensors 708 may be designed as rotational angle pickups and/or as torque pickups in one embodiment of the present invention.

Figure 8A:
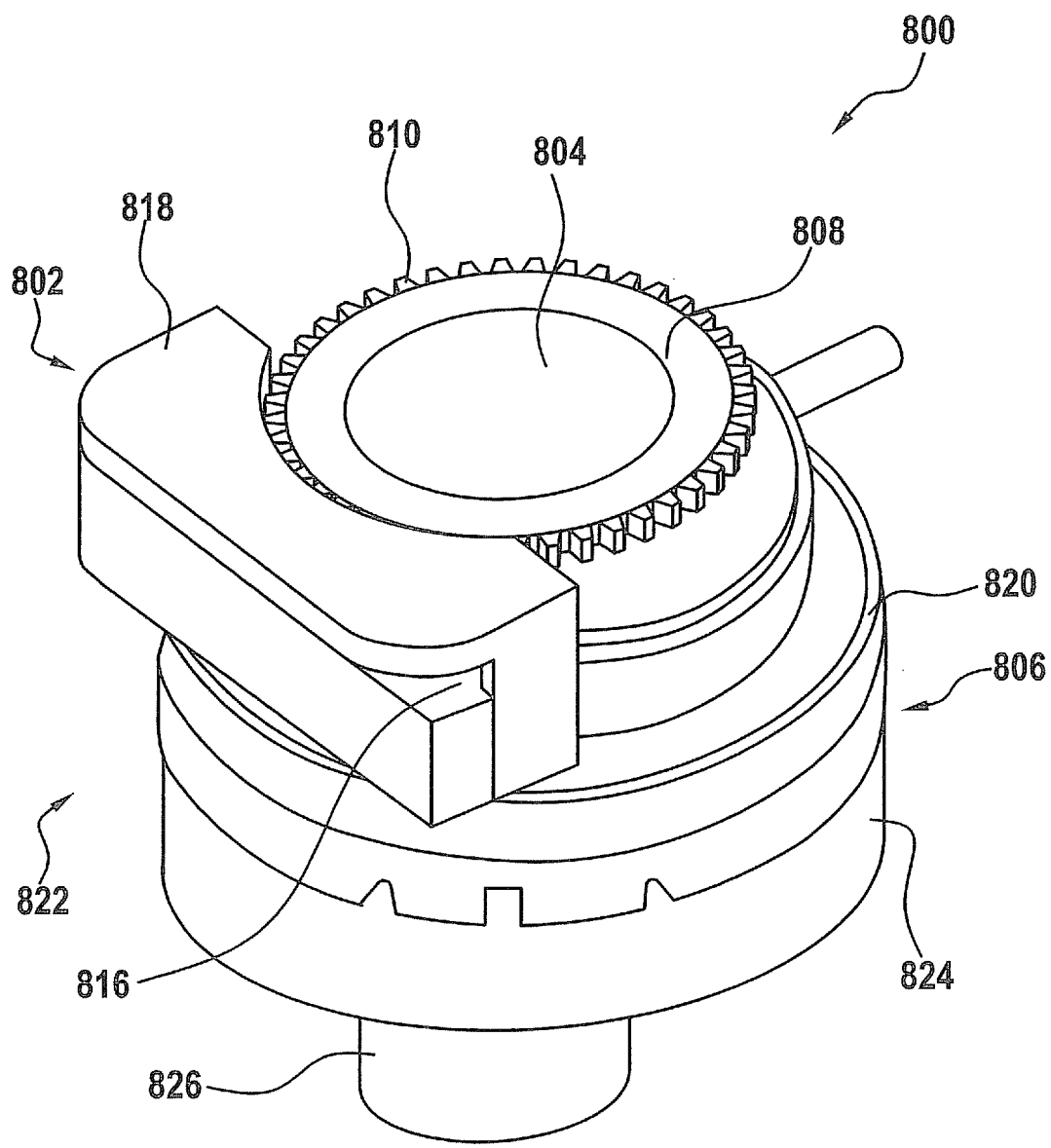
FIG. 8 shows a schematic view of a fifth specific embodiment of a sensor system according to the present invention.
Figure 8B:
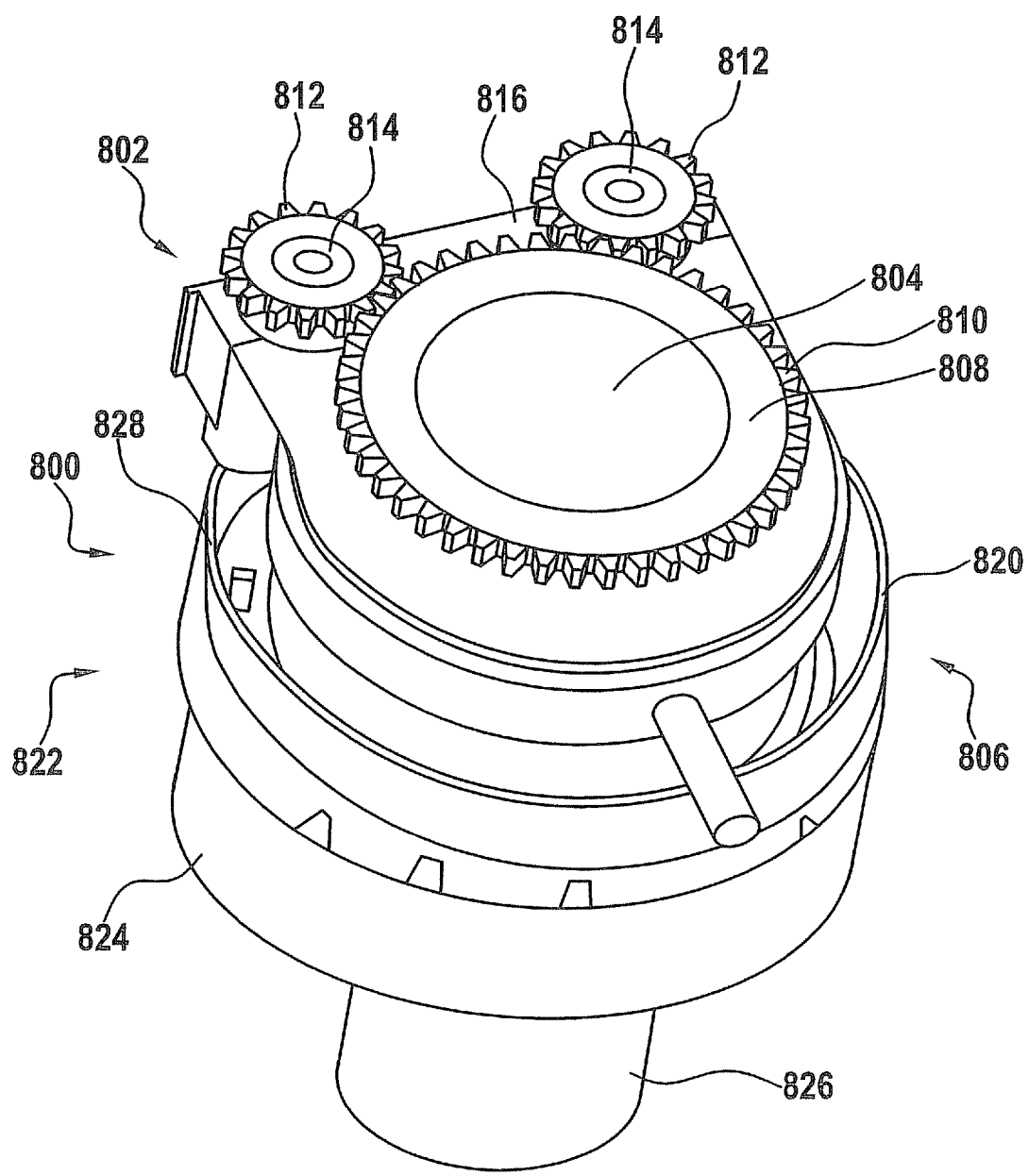

FIG. 8 shows details of a fifth specific embodiment of a sensor system 800 according to the present invention. This sensor system 800 includes a rotational angle sensor 802 for detecting a rotational angle of a first shaft 804 when shaft 804 rotates about its axis relative to a component (not shown in greater detail in FIG. 8). In addition, sensor system 800 includes a magnetic flux unit 806 as a component of a torque sensor, which is designed for the purpose of detecting a torque acting on shaft 804 in the event of a rotation of shaft 804.

A sleeve 808, which coaxially encloses shaft 804, is fastened as a module via a hub on an outer wall of first shaft 804. A large gear wheel 810 is fastened as a rotational angle transmitter in an upper area of sleeve 808. This large gear wheel 810 cooperates with two small gear wheels 812 as rotational angle pickups of rotational angle sensor 802. Each small gear wheel 812 has magnets 814 in this case. Both small gear wheels 812 are rotatably fastened on the component. A printed circuit board 816 is situated below small gear wheels 812, this printed circuit board 816 including two magnetic-field-sensitive sensors as rotational angle pickups, which are situated below magnets 814 of small gear wheels 812. The magnetic-field-sensitive sensors, as components of printed circuit board 816, are concealed in FIG. 8b by small gear wheels 812 having magnets 814. Furthermore, small gear wheels 812 are concealed by a housing 818 in FIG. 8a. The absolute angle of first shaft 804 may be ascertained from the rotational angles of both small gear wheels 812 according to the Vernier principle.

Magnetic flux unit 806 is situated like large gear wheel 810 on sleeve 808 and includes a ring 820. This ring 820 is made of ferromagnetic material. Illustrated magnetic flux unit 806, as a component of a torque sensor 822, is designed for the purpose of amplifying a magnetic field which is provided by a magnet unit 824. This magnet unit 824 is designed as a torque transmitter 822, and is fastened on a second shaft 826. The teeth of large gear wheel 810, as index elements for determining a rotational angle of first shaft 804, and magnetic flux unit 806 are therefore situated rotationally fixed to one another on sleeve 808 and accordingly on first shaft 804.

First shaft 804 and second shaft 826 may rotate relative to one another about a common axis. In addition, these two shafts 804, 826 are connected to one another via a torsion bar, which is, however, concealed in FIG. 8 by sensor system 800. If the two shafts 804, 826 rotate relative to one another, the torsion bar is twisted between these two shafts 804, 826, whereby a torque is generated. Furthermore, in the event of a relative rotation of these two shafts 804, 826 to one another, a differential angle results between these two shafts 804, 826. This differential angle is proportional to the torque. In the event of the relative rotation of the two shafts 804, 826 to one another, magnet unit 824 is also rotated relative to magnetic flux unit 806. The rotating magnetic field generated by magnet unit 824 is amplified by magnetic flux unit 806 and detected by a magnetic-field-sensitive sensor 828, which is designed as a torque pickup and is also fastened on the component. The torque is ascertained from this detected magnetic field in a specific embodiment of the method according to the present invention.

What is claimed is:
1. A sensor system, comprising:
 a rotational angle sensor for detecting a rotational angle, wherein the rotational angle sensor has a rotatable rotational angle transmitter having index elements; and
 a torque sensor for detecting a torque, wherein the torque sensor has (i) a rotatable torque transmitter having magnets which generate a magnetic field, and (ii) a magnetic flux unit for amplifying the magnetic field;
 wherein the index elements and the magnetic flux unit are connected to one another in a rotationally fixed manner, wherein the rotational angle transmitter is configured as a multi-pole wheel having circularly situated index elements,
wherein the torque transmitter is configured as a magnet unit having circularly situated magnets,
wherein the multi-pole wheel and the magnet unit have a common axis,
wherein the index elements of the rotational angle transmitter are configured as magnets of the multi-pole wheel, and
wherein the at least one rotational angle pickup is configured as a magnetic-field-sensitive sensor.

2. The sensor system as recited in claim 1, wherein:
the rotational angle sensor has at least one rotational angle pickup for detecting a rotational movement of the index elements,
the torque sensor has at least one magnetic-field-sensitive sensor for detecting the magnetic field, and
the rotational angle pickup and the at least one magnetic-field-sensitive sensor are situated on a component.

3. The sensor system as recited in claim 2, wherein the rotational angle pickup and the at least one magnetic-field-sensitive sensor are connected to a printed circuit board.

4. The sensor system as recited in claim 2, wherein:
the index elements of the rotational angle transmitter are configured as teeth of a first gear wheel,
the at least one rotational angle pickup is configured as a second gear wheel, and
teeth of the first gear wheel and teeth of at least one second gear wheel mesh into one another.

5. A sensor system, comprising:
a rotational angle sensor for detecting a rotational angle, wherein the rotational angle sensor has a rotatable rotational angle transmitter having index elements; and
a torque sensor for detecting a torque, wherein the torque sensor has (i) a rotatable torque transmitter having magnets which generate a magnetic field, and (ii) a magnetic flux unit for amplifying the magnetic field;
wherein the index elements and the magnetic flux unit are connected to one another in a rotationally fixed manner,
wherein the index elements and the magnetic flux unit are situated on a first shaft,
wherein the torque transmitter is situated on a second shaft,
wherein the rotational angle sensor detects a rotational angle of the first shaft,
wherein the torque sensor detects a differential angle between the first shaft and the second shaft, and
wherein the index elements and the magnetic flux unit are situated on a sleeve which is connected to the first shaft in a rotationally fixed manner.

6. The sensor system as recited in claim 5, wherein:
the rotational angle sensor has at least one rotational angle pickup for detecting a rotational movement of the index elements,
the torque sensor has at least one magnetic-field-sensitive sensor for detecting the magnetic field, and
the rotational angle pickup and the at least one magnetic-field-sensitive sensor are situated on a component.

7. The sensor system as recited in claim 6, wherein the rotational angle pickup and the at least one magnetic-field-sensitive sensor are connected to a printed circuit board.

8. The sensor system as recited in claim 6, wherein:
the index elements of the rotational angle transmitter are configured as teeth of a first gear wheel,
the at least one rotational angle pickup is configured as a second gear wheel, and
teeth of the first gear wheel and teeth of at least one second gear wheel mesh into one another.

9. A method for detecting a rotational angle and a torque, the method comprising:
providing a sensor system which has a rotational angle sensor and a torque sensor;
detecting, with the aid of the rotational angle sensor, a rotation of a rotational angle transmitter having index elements; and
detecting, with the aid of the torque sensor, a rotation of a torque transmitter having magnets;
wherein a magnetic field is generated by the magnets and amplified by a magnetic flux unit, and wherein the index elements and the magnetic flux unit are connected to one another in a rotationally fixed manner,
wherein the rotational angle transmitter is configured as a multi-pole wheel having circularly situated index elements,
wherein the torque transmitter is configured as a magnet unit having circularly situated magnets,
wherein the multi-pole wheel and the magnet unit have a common axis,
wherein the index elements of the rotational angle transmitter are configured as magnets of the multi-pole wheel, and
wherein the at least one rotational angle pickup is configured as a magnetic-field-sensitive sensor.

10. The method as recited in claim 9, wherein a steering angle is detected as the rotational angle, and a torque of a steering system of a motor vehicle is detected.

11. The method as recited in claim 9, wherein:
the rotational angle sensor has at least one rotational angle pickup for detecting a rotational movement of the index elements,
the torque sensor has at least one magnetic-field-sensitive sensor for detecting the magnetic field, and
the rotational angle pickup and the at least one magnetic-field-sensitive sensor are situated on a component.

12. The method as recited in claim 11, wherein the rotational angle pickup and the at least one magnetic-field-sensitive sensor are connected to a printed circuit board.

13. The method as recited in claim 11, wherein:
the index elements of the rotational angle transmitter are configured as teeth of a first gear wheel,
the at least one rotational angle pickup is configured as a second gear wheel, and
teeth of the first gear wheel and teeth of at least one second gear wheel mesh into one another.

14. A method for detecting a rotational angle and a torque, the method comprising:
providing a sensor system which has a rotational angle sensor and a torque sensor;
detecting, with the aid of the rotational angle sensor, a rotation of a rotational angle transmitter having index elements; and
detecting, with the aid of the torque sensor, a rotation of a torque transmitter having magnets;
wherein a magnetic field is generated by the magnets and amplified by a magnetic flux unit, and wherein the index elements and the magnetic flux unit are connected to one another in a rotationally fixed manner,
wherein the index elements and the magnetic flux unit are situated on a first shaft,
wherein the torque transmitter is situated on a second shaft,
wherein the rotational angle sensor detects a rotational angle of the first shaft, wherein the torque sensor detects a differential angle between the first shaft and the second shaft, and wherein the index elements and the magnetic flux unit are situated on a sleeve which is connected to the first shaft in a rotationally fixed manner.

15. The method as recited in claim 14, wherein:

the rotational angle sensor has at least one rotational angle pickup for detecting a rotational movement of the index elements, the torque sensor has at least one magnetic-field-sensitive sensor for detecting the magnetic field, and the rotational angle pickup and the at least one magnetic-field-sensitive sensor are situated on a component.

16. The method as recited in claim 15, wherein the rotational angle pickup and the at least one magnetic-field-sensitive sensor are connected to a printed circuit board.

17. The method as recited in claim 15, wherein:

the index elements of the rotational angle transmitter are configured as teeth of a first gear wheel, the at least one rotational angle pickup is configured as a second gear wheel, and teeth of the first gear wheel and teeth of at least one second gear wheel mesh into one another.

18. The method as recited in claim 14, wherein a steering angle is detected as the rotational angle, and a torque of a steering system of a motor vehicle is detected.

\* \* \* \* \*